Patented Nov. 3, 1942

2,301,123

UNITED STATES PATENT OFFICE 2,301,123

ABRASIVE GRAIN

Abraham Albert Klein, Worcester, Mass., assignor to Norton Company, Worcester, Mass., a corporation of Massachusetts No Drawing. Application July 2, 1941, Serial No. 400,864

4 Claims. (Cl. 51—309)

The invention relates to abrasive grain.

One object of the invention is to provide abrasive grain for set-up wheels and sandpaper which shall be free-cutting and give a high ratio of material removed to wheel wear. Another object of the invention is to provide abrasive grain of good cutting characteristics which adhere well to a set-up wheel or to sandpaper. Another object of the invention is to provide abrasive grain for set-up wheels which will give an excellent rate of cut as measured by MR/WW and also by $MR^2/WW$ where MR is material removed and WW is wheel wear.

Another object of the invention is to provide a superior grit for abrasive coated products. Another object of the invention is to provide abrasive grain of good bonding characteristics relative to glue and sodium silicate. Another object of the invention is to provide a soft acting abrasive grain. Another object of the invention is to provide abrasive grain which will make a silicate coated set-up wheel act softer. Another object of the invention is to provide abrasive grain which gives good performance on polishing wheels, whether bonded with glue or with silicate. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

Fused alumina $Al_2O_3$ is commonly used in grain form for the coating of set-up wheels to grind such implements as hardware including small tools, bumper bars for automobiles, also automobile bodies and fenders, agricultural implements and the like. Set-up wheels may be of many different forms, but often consist of disks of canvas held together by a central spindle and washers, the peripheries of the disks being coated with glue or some prepared cement such as sodium silicate upon which the abrasive grain is sprinkled. The present invention involves improved aluminous abrasive grain for use as above indicated and also from which to manufacture sandpaper and abrasive cloth.

By the expression "aluminous abrasive" or "alumina" I include the product of the electric furnace which is mainly crystalline $Al_2O_3$ in various degrees of purity including the porous as well as the dense product, also emery which is largely $Al_2O_3$, corundum which is a natural alumina of high purity, and similar materials the major part of which is alumina of the formula $Al_2O_3$.

Considering now the preparation of the new improved product, I may proceed according to the following example:

EXAMPLE

To 300 pounds of No. 120 grit size dense brown fused alumina of chunky shape were added 4 pounds and 12 ounces of water and 5½ ounces of commercial sodium silicate ($Na_2O + 3SiO_2 + 45\% H_2O$). The materials were placed in a mixer and mixed for five minutes. Then 2 pounds and 3 ounces of plaster of Paris, calcium sulfate ($CaSO_4 \cdot \frac{1}{2} H_2O$), was added to the mixer and mixing was continued for ten minutes more. After mixing, the product was placed in cans and heated in a kiln at 475° C. for one week. The product was then screened and, after screening, was complete and ready for sale. No sintering took place during the heating in the kiln and final examination revealed an excellent coating, very uniform and well retained.

The object of the foregoing was to coat the alumina grains with calcium sulfate. Plaster of Paris containing one-half of a molecule of water of crystallization was used but other calcium sulfates could equally well be employed. For example, hydrated plaster of Paris containing two molecules of water of crystallization could be employed or it would be feasible to use fully dehydrated plaster of Paris which is generally known under the name soluble anhydrite. Whichever one of these calcium sulfates is employed, the product is substantially the same because the heat treatment for one week at 475° C. removes the water of crystallization and the final product is substantially dehydrated calcium sulfate, viz. soluble anhydrite.

I could equally well use either of strontium sulfate $SrSO_4$ or barium sulfate $BaSO_4$ and excellent results can also be achieved with magnesium sulfate $MgSO_4$ although it does not adhere to the set-up wheels as well as do the other three alkaline earth metal sulfates. Within the scope of my invention, fused alumina may be coated with any sulfate of an alkaline earth metal.

Polishing wheels coated with the coated abrasive grain of the invention gave excellent results, as shown by the following tables. The coating of the grain upon the wheels was very even and well retained. The grain showed little tendency to shed and dustiness was very low. The grain showed no tendency to pick up moisture.

Comparison tests of coated grain according to the invention were made against other coated grains. The grain of the invention will be designated by the number 1. Abrasive grain No. 2 is the same chunky, dense, brown fused alumina, heat treated at 600° C. for hours but without any coating. Such grain has been found very useful for set-up and polishing wheels in the past. Grain No. 3 is the same fused alumina coated by means of sodium silicate with clay and iron oxide. This treatment has been found to be very effective in the past. To make the comparison fair, grit sizes 120 were used throughout. In preparing grain No. 3, the chunky fused alumina was first mixed with water and sodium silicate and then the clay and iron oxide were added, the procedure being otherwise substantially the same as in the case of the preparation of abrasive grain No. 1 of the invention.

Canvas polishing wheels 16″x2″x1½″ were used. Three wheels were set up with glue and three wheels with a commercial sodium silicate cement known as Grainlock "C" cement. The polishing results were as follows:

TABLE I

*Abrasive grain coated on periphery of canvas polishing wheel with glue bond*

| Grain | Wheel wear | Material removed | Minutes | $\frac{W.W.}{Min.}$ | $\frac{M.R.}{Min.}$ | $\frac{M.R.}{W.W.}$ | $\frac{(M.R.)^2}{(Min.)} \div \frac{(W.W.)}{(Min.)}$ |
|---|---|---|---|---|---|---|---|
|   | Grams | Grams |   |   |   |   |   |
| 1 | 580 | 1,150 | 75 | 7.7 | 15.4 | 2.0 | 31. |
| 2 | 560 | 942 | 75 | 7.5 | 12.6 | 1.7 | 21. |
| 3 | 555 | 870 | 75 | 7.4 | 11.6 | 1.6 | 16. |

TABLE II

*Same—Remarks*

1. Even and free cutting, right to canvas.
2. Acted hard, cut well at first, then glazed.
3. Harder than 1, glazed, slow.

TABLE III

*Abrasive grain coated on periphery of canvas polishing wheels with sodium silicate cement*

| Grain | Wheel wear | Material removed | Minutes | $\frac{W.W.}{Min.}$ | $\frac{M.R.}{Min.}$ | $\frac{M.R.}{W.W.}$ | $\frac{(M.R.)^2}{(Min.)} \div \frac{(W.W.)}{(Min.)}$ |
|---|---|---|---|---|---|---|---|
|   | Grams | Grams |   |   |   |   |   |
| 1 | 355 | 1075 | 80 | 4.4 | 13.5 | 3.1 | 41. |
| 2 | 171 | 700 | 70 | 2.4 | 10.0 | 4.2 | 41. |
| 3 | 450 | 900 | 55 | 8.2 | 16.2 | 2.0 | 32. |

TABLE IV

*Same—Remarks*

1. Smooth cutting—very little glaze.
2. Very hard acting but cut well. Finally glazed.
3. Cut well but had short life.

In explanation of the foregoing tables, it must be understood that there is no possible standard of excellence of any grinding wheel, polishing wheel or the like. The ratio of material removed to wheel wear has frequently been used as the measure of performance. But it is clear that a diamond grinding wheel having an excellent ratio of material removed to wheel wear might be totally unsuitable for some production job where a high rate of production was required. In other words, the manufacturer considers not only the economy of the grinding wheel but also the economy of his operator's time. The time employed by the operator in doing a particular grinding job is, therefore, a factor. So also is the shop overhead. This being the case, variations in the wages of the operators will set different standards of excellence for grinding wheels and polishing wheels.

It has lately been considered that a rough formula for the excellence of many abrasive products is expressed by squaring the material removed in a given time and dividing by the wheel wear in a given time. This formula takes into account average rates of pay and average overheads. A polishing wheel may show a high ratio of material removed to wheel wear and yet be unsatisfactory because the wheel acts too hard and it takes too long to do a given polishing job.

In Tables I and III the heading "Grain" identifies the particular treatment as aforesaid, the heading "Minutes" represents the polishing time, W. W./Min. represents wheel wear divided by the time, M. R./Min. represents material removed divided by the time, M. R./W. W. represents material removed divided by wheel wear, and in the final column material removed per minute squared over wheel wear per minute represents material removed in one minute squared divided by the wheel wear for one minute.

It is noted that with glue adhesive, the grain treated according to the invention showed the highest ratio of M. R./W. W. and also the highest ratio of material removed per minute squared over wheel wear per minute and, in fact, grain according to the invention was decidedly better than the next best. When using sodium silicate cement, grain treated according to the invention was equal to the next best, viz. No. 2 which is merely heat treated, in material removed per minute squared over wheel wear per minute although somewhat inferior to No. 2 in ratio of material removed to wheel wear. However, the squared formula probably represents a more accurate quality rating and the grain of this invention can be rated as good as heat treated grain for silicate wheels and better than heat treated grain for glue polishing wheels. It is a distinct advantage to have a given grain which gives a high quality performance both with sodium silicate and glue cements on polishing wheels.

Tables II and IV show accurately the manner in which the grains perform and show decided superiority of the grain of the invention over the other two selected for comparison. It may also be observed that the comparison grains 2 and 3 have heretofore been the best in all around performance.

The procedure for setting up the wheels with glue was standard throughout, using 25% glue solution for set-up after sizing with a 15% solution. Two coatings were applied to each wheel. At least 48 hours was allowed for drying at 85° F. and 50% humidity before testing.

For setting up the wheels with sodium silicate cement, the instructions found on the Grainlock "C" container were followed to the letter. The wheels were sized with a 50-50 mixture of cement and thinner. Two coatings were applied to each wheel after which they were dried at least 48 hours at 140° F. before testing. Polishing was done on a polishing jack with a wheel speed of 5000 surface feet per minute and a traverse of 40 feet per minute. Tool steel plates were ground for one minute each at 40 pounds of pressure. After grinding each five plates, the wheel wear and material removed were recorded.

Tests were also made to show the relative amount of shedding with the grain of this invention as compared with other grain in glue bond. It was found that grain No. 1 treated according to the invention has slightly less tendency to shed than grain No. 2 or grain No. 3.

It will thus be seen that there has been provided by this invention an article and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. As a new article of manufacture, a single discrete abrasive grain, unbonded to other abrasive grains, consisting of crystalline alumina coated with an alkaline earth metal sulfate.

2. As a new article of manufacture, a single discrete abrasive grain, unbonded to other abrasive grains, consisting of crystalline alumina coated with calcium sulfate.

3. As a new article of manufacture, a single discrete abrasive grain, unbonded to other abrasive grains, consisting of crystalline alumina having a coating of sodium silicate in which is a quantity of an alkaline earth metal sulfate.

4. As a new article of manufacture, a single discrete abrasive grain, unbonded to other abrasive grains, consisting of crystalline alumina having a coating of sodium silicate in which is a quantity of calcium sulfate.

ABRAHAM ALBERT KLEIN.